United States Patent
Carpenter et al.

(10) Patent No.: US 9,235,402 B2
(45) Date of Patent: *Jan. 12, 2016

(54) DYNAMIC RELEASE CONTROL OF SOFTWARE APPLICATION VERSION CHANGES

(71) Applicant: CA, Inc., Islandia, NY (US)

(72) Inventors: Robert L. Carpenter, Beaver, PA (US); Gary R. Gulasky, Oakdale, PA (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,128

(22) Filed: Nov. 4, 2014

(65) Prior Publication Data

US 2015/0095899 A1 Apr. 2, 2015

Related U.S. Application Data

(63) Continuation of application No. 13/940,777, filed on Jul. 12, 2013, now Pat. No. 8,918,775.

(51) Int. Cl.
*G06F 9/44* (2006.01)
*G06F 9/445* (2006.01)

(52) U.S. Cl.
CPC .............. *G06F 8/65* (2013.01); *G06F 9/44505* (2013.01)

(58) Field of Classification Search
USPC .................................. 717/168–174; 709/203
IPC ................................. G06F 8/60,8/65, 8/71, 8/70
See application file for complete search history.

(56) References Cited

U.S. PATENT DOCUMENTS

| 6,167,567 | A  | * | 12/2000 | Chiles ................... G06F 9/4448 709/221 |
| 6,438,594 | B1 |   | 8/2002  | Bowman-Amuah |
| 6,807,558 | B1 |   | 10/2004 | Hassett et al. |
| 6,816,882 | B1 | * | 11/2004 | Conner et al. ................. 709/203 |
| 6,874,143 | B1 | * | 3/2005  | Murray ............... G06F 9/44526 717/168 |
| 6,976,062 | B1 | * | 12/2005 | Denby et al. ................... 709/220 |
| 7,000,230 | B1 | * | 2/2006  | Murray ..................... G06F 8/61 717/170 |
| 7,047,527 | B1 | * | 5/2006  | Lin .......................... G06F 8/65 717/122 |

(Continued)

OTHER PUBLICATIONS

Cangussu et al, "Software Release Control using Defect Based Quality Estimation", IEEE, pp. 1-11, 2004.*

(Continued)

*Primary Examiner* — Anil Khatri
(74) *Attorney, Agent, or Firm* — Stevens & Showalter, LLP

(57) ABSTRACT

Dynamic release control is performed by identifying a plurality of software application instances installed on a mainframe system, identifying a compatibility level for each software application instance, designating a common execution level based upon a lowest one of the identified compatibility levels, configuring each software application instance to conform to the common execution level, receiving a software update indication that at least one software application instance has been updated and performing a compatibility level switch across the plurality of software application instances after receiving the software update indication if a lowest one of the compatibility levels is different from the common execution level by adjusting the common execution level based upon the lowest one of the compatibility levels and by reconfiguring each software application instance to operate in a mode that constrains the corresponding software application instance to conform to the adjusted common execution level.

20 Claims, 10 Drawing Sheets

(56) References Cited

U.S. PATENT DOCUMENTS

| | | | | |
|---|---|---|---|---|
| 7,174,547 | B2* | 2/2007 | Wang | G06F 8/65 709/221 |
| 7,222,340 | B2* | 5/2007 | Willis, II | 717/168 |
| 7,478,385 | B2* | 1/2009 | Sierer et al. | 717/174 |
| 7,581,217 | B2* | 8/2009 | Jhanwar et al. | 717/168 |
| 7,676,803 | B2* | 3/2010 | Zhao et al. | 717/168 |
| 7,856,631 | B2* | 12/2010 | Brodkorb et al. | 717/177 |
| 7,861,239 | B2* | 12/2010 | Mayfield et al. | 717/170 |
| 7,865,889 | B1 | 1/2011 | Bird et al. | |
| 8,074,217 | B2* | 12/2011 | James | G06F 8/60 717/169 |
| 8,150,913 | B2* | 4/2012 | Cheah | G06Q 10/06 709/202 |
| 8,185,884 | B2* | 5/2012 | Sudhakar | G06F 8/65 717/169 |
| 8,196,134 | B2* | 6/2012 | Clinton | G06F 8/65 717/169 |
| 8,239,850 | B2* | 8/2012 | Gielniak | G06F 8/65 717/126 |
| 8,245,219 | B2* | 8/2012 | Agarwal et al. | 717/172 |
| 8,266,615 | B2 | 9/2012 | Shapiro | |
| 8,397,230 | B2* | 3/2013 | Ewington | G06F 8/68 717/168 |
| 8,549,512 | B1* | 10/2013 | Vannatter et al. | 717/171 |
| 8,555,273 | B1 | 10/2013 | Chia et al. | |
| 8,584,113 | B2* | 11/2013 | McCurdy | G06F 8/68 717/168 |
| 8,621,450 | B2 | 12/2013 | Firman et al. | |
| 8,635,608 | B2 | 1/2014 | Ramesh et al. | |
| 8,640,119 | B2 | 1/2014 | Vidal et al. | |
| 8,745,614 | B2 | 6/2014 | Banerjee et al. | |
| 8,776,038 | B2 | 7/2014 | Larimore et al. | |
| 8,799,890 | B2 | 8/2014 | Vidal et al. | |
| 8,918,775 | B1* | 12/2014 | Carpenter | G06F 9/44505 709/203 |
| 2007/0168919 | A1 | 7/2007 | Henseler et al. | |
| 2010/0131084 | A1 | 5/2010 | Van Camp | |
| 2013/0055155 | A1 | 2/2013 | Wong et al. | |

OTHER PUBLICATIONS

Ramakrishnan "Software Release Management", Bell Labs Technical Journal 9(1), pp. 205-210, 2004.*

Marquardt, "Patterns for Software Release Versioning", ACM, pp. 1-13, 2010.*

Benestad et al, "A Comparison of Model-based and Judgment-based Release Planning in Incremental Software Projects", ACM, pp. 766-775, 2011.*

Bechter et al., "Compatibility Models", ACM; pp. 5-11; 2006.

Han et al., "Ensuring Compatible Interactions within Component-based Software System"; IEEE; pp. 1-10; 2003.

Savga et al., "Refactoring-Based Support for Binary Compatibility in Evolving Frameworks"; ACM; pp. 175-184; 2007.

Yoon et al., "Effective and Scalable Software Compatibility Testing"; ACM; pp. 63-73; 2008.

Beck et al., Dynamic Reconfiguration with Binary Translation: Breaking the ILP Barrier with Software Compatibility; ACM; pp. 732-737; 2005.

Mariani et al.; "Compatibility and regression testing of COTS-component-based software"; IEEE; pp. 1-10; 2007.

Khatri, Anil; Notice Of Allowance; U.S. Appl. No. 13/940,777; Aug. 18, 2014; United States Patent and Trademark Office; Alexandria, Virginia.

* cited by examiner

| SYSTEM VIEW | PRODUCT VIEW | ADMINISTRATION | | | |
|---|---|---|---|---|---|
| | | EXECUTION LIBRARIES | | | |
| SYSTEM NAME | COMPAT STATUS | PRODUCT RELEASE | BUILD LEVEL | COMPAT LEVEL | BACKOUT FILES |
| PRODUCT A | ✓ | R15.0 | BUILD 64 ••• | 15 | CLICK HERE |
| PRODUCT B | ✓ | R15.0 | BUILD 18 | 15 | CLICK HERE |
| PRODUCT C | ✗ | R12.0 | BUILD 12 | 12 | CLICK HERE |
| PRODUCT D | ✓ | R12.5 | BUILD 06 | 06 | CLICK HERE |
| PRODUCT E | ✓ | R12.5 | BUILD 05 | 12 | |
| PRODUCT F | ✗ | R18.0 | BUILD 16 ••• | 16 | CLICK HERE |

| SYSTEM NAME | PRODUCT RELEASE | NEW BUILD LEVEL | NEW COMPAT LEVEL | BACKOUT FILES | UPGRADE POLICY FLOW | BACKOUT POLICY FLOW | CAPABILITY PENDING |
|---|---|---|---|---|---|---|---|
| PRODUCT A<br>PRODUCT B<br>PRODUCT C<br>PRODUCT D<br>PRODUCT E<br>PRODUCT F | R13.0 | BUILD 13 | 13.0 | CLICK HERE | CLICK HERE | CLICK HERE | CLICK HERE |
| | R19.0 | BUILD 17 | 17.0 | CLICK HERE | CLICK HERE | CLICK HERE | CLICK HERE |

DYNAMIC RELEASE CONTROL

INSTALLATION LIBRARIES

UPLOAD DRC

FIG. 6B

| SYSTEM VIEW | PRODUCT VIEW | ADMINISTRATION | | | |
|---|---|---|---|---|---|
| SYSTEM NAME | COMPAT STATUS | EXECUTION LIBRARIES | | | |
| | | PRODUCT RELEASE | BUILD LEVEL | COMPAT LEVEL | BACKOUT FILES |
| PRODUCT C<br>SUB 1<br>SUB 2<br>SUB 3 | ✓<br>✓<br>✗ | R13<br>R13<br>R12 | ●●●<br>BUILD 13<br>BUILD 13<br>BUILD 12 | 13.0<br>13.0<br>12.0 | CLICK HERE<br>CLICK HERE<br>CLICK HERE |
| PRODUCT F<br>SUB 1<br>SUB 2 | ✓<br>✗ | R17<br>R16 | BUILD 17<br>BUILD 16<br>●●● | 17.0<br>16.0 | CLICK HERE<br>CLICK HERE |

FIG. 7A

| UPLOAD DRC | | | | DYNAMIC RELEASE CONTROL ▽ | | | |
|---|---|---|---|---|---|---|---|
| | | | | INSTALLATION LIBRARIES | | | |
| SYSTEM NAME | PRODUCT RELEASE | NEW BUILD LEVEL | NEW COMPAT LEVEL | BACKOUT FILES | UPGRADE POLICY FLOW | BACKOUT POLICY FLOW | CAPABILITY PENDING |
| PRODUCT C SUB 1 SUB 2 SUB 3 | R13.0 | BUILD 13 | 13.0 | CLICK HERE | CLICK HERE | CLICK HERE | CLICK HERE |
| PRODUCT F SUB 1 SUB 2 | R19.0 | BUILD 32 | 17.0 | CLICK HERE | CLICK HERE | CLICK HERE | CLICK HERE |

FIG. 7B

DYNAMIC RELEASE CONTROL OF SOFTWARE APPLICATION VERSION CHANGES

CROSS REFERENCE TO RELATED APPLICATIONS

This application is a continuation of U.S. patent application Ser. No. 13/940,777, filed Jul. 12, 2013, entitled "DYNAMIC RELEASE CONTROL", now allowed, the disclosure of which is hereby incorporated herein by reference.

BACKGROUND

The present disclosure relates in general to computer systems and in particular, to the dynamic control and management of software application version changes on a mainframe system.

Mainframe systems are computer platforms used primarily by business and governmental organizations to support large scale computing operations. Notably, mainframe systems often find favor in activities that require access to large volumes of data and in applications that impose large data transfer requirements. Mainframe systems also often find favor in applications that generate high transaction volumes and in applications that require high speed data processing. Mainframe systems are also used primarily in activities requiring a high level of security, scalability, reliability, etc.

System programmers are employed to manage the mainframe operations and networking capabilities. In this regard, system programmer duties include testing the mainframe software, troubleshooting mainframe system and networking operations, defining functional specifications, performing software updates, and performing research related to these duties.

BRIEF SUMMARY

According to various aspects of the present disclosure, dynamic release control is provided. Dynamic release control is performed by identifying software application instances on a mainframe system and by identifying a compatibility level for each identified software application instance. In this regard, the compatibility level corresponds with at least one execution characteristic (e.g., features, functions, capabilities, requirements, etc.) of the corresponding software application instance. Dynamic release control also comprises designating a common execution level based upon a select one of the identified compatibility levels, and configuring each identified software application instance to conform to the common execution level. Dynamic release control still further comprises receiving a software update indication that a select one identified software application instance has been updated to a version that has a new compatibility level. In this manner, the updated software application instance, when executed, continues to conform to the common execution level after the corresponding update. Dynamic release control also comprises performing a compatibility level switch across the identified software application instances after receiving the software update indication if a lowest one of the compatibility levels is different from the common execution level by adjusting the common execution level based upon the lowest one of the compatibility levels and by reconfiguring each identified software application instance to conform to the adjusted common execution level.

BRIEF DESCRIPTION OF THE DRAWINGS

FIG. 6A is a first half of a dashboard display for managing dynamic release control, according to aspects of the present disclosure herein;

FIG. 6B is a second half of the dashboard display of FIG. 6A, for managing dynamic release control, according to aspects of the present disclosure herein;

FIG. 7A is a first half of a dashboard display for managing dynamic release control, according to aspects of the present disclosure herein;

FIG. 7B is a second half of the dashboard display of FIG. 7A, for managing dynamic release control, according to aspects of the present disclosure herein.

DETAILED DESCRIPTION

Aspects of the present disclosure provide solutions to simplify and automate software version control across a mainframe system. For instance, a dynamic release control is provided, which manages and (at least partially) automates the software upgrade process of mainframe software applications. The dynamic release control ensures that requirements for upgrading to the new release are in place and that all associated components are ready to be upgraded before committing to the change. Moreover, the dynamic release control ensures that requirements for dropping back to the prior level are in place in case a decision is made to revert back to the current (or a previous version) of the software application once an update is in process. Still further, the dynamic release control may ensure that back leveled components have the right toleration maintenance in place to be able to integrate with new releases of software applications executed on the corresponding mainframe system, as will be described in greater detail herein.

As used herein, the term "mainframe system" means a computer system that includes at least one mainframe computer. In practice, a system programmer may manage an enterprise that includes a single mainframe computer, or the enterprise may include multiple mainframe computers. The system may also include non-mainframe computers, including devices such as servers, intelligent storage devices, etc. Moreover, each computer may comprise a physical computer, or a virtual computer. Still further, the computers may be co-located or distributed, and are typically connected together by a network. Moreover, each mainframe computer hosts one or more platforms, e.g., operating systems such as WINDOWS® (WINDOWS is a registered trademark of Microsoft Corporation), Unix, z/OS® (z/OS is a registered trademark of International Business Machines, Corp.), z/Linux, z/VM® (z/VM is a registered trademark of International Business Machines, Corp.), etc. As an example, a "mainframe system" may comprise any combination of virtual and physical computers including virtual and physical mainframe computers, where each computer hosts one or more platforms (e.g., operating systems). Moreover, each computer hosts multiple applications. In this regard, a given software application can have multiple software instances on the mainframe system, each software application instance installed for execution in a different operating environment within the mainframe system, e.g., on a different computer, within a different operating system, etc.

Figure 1:
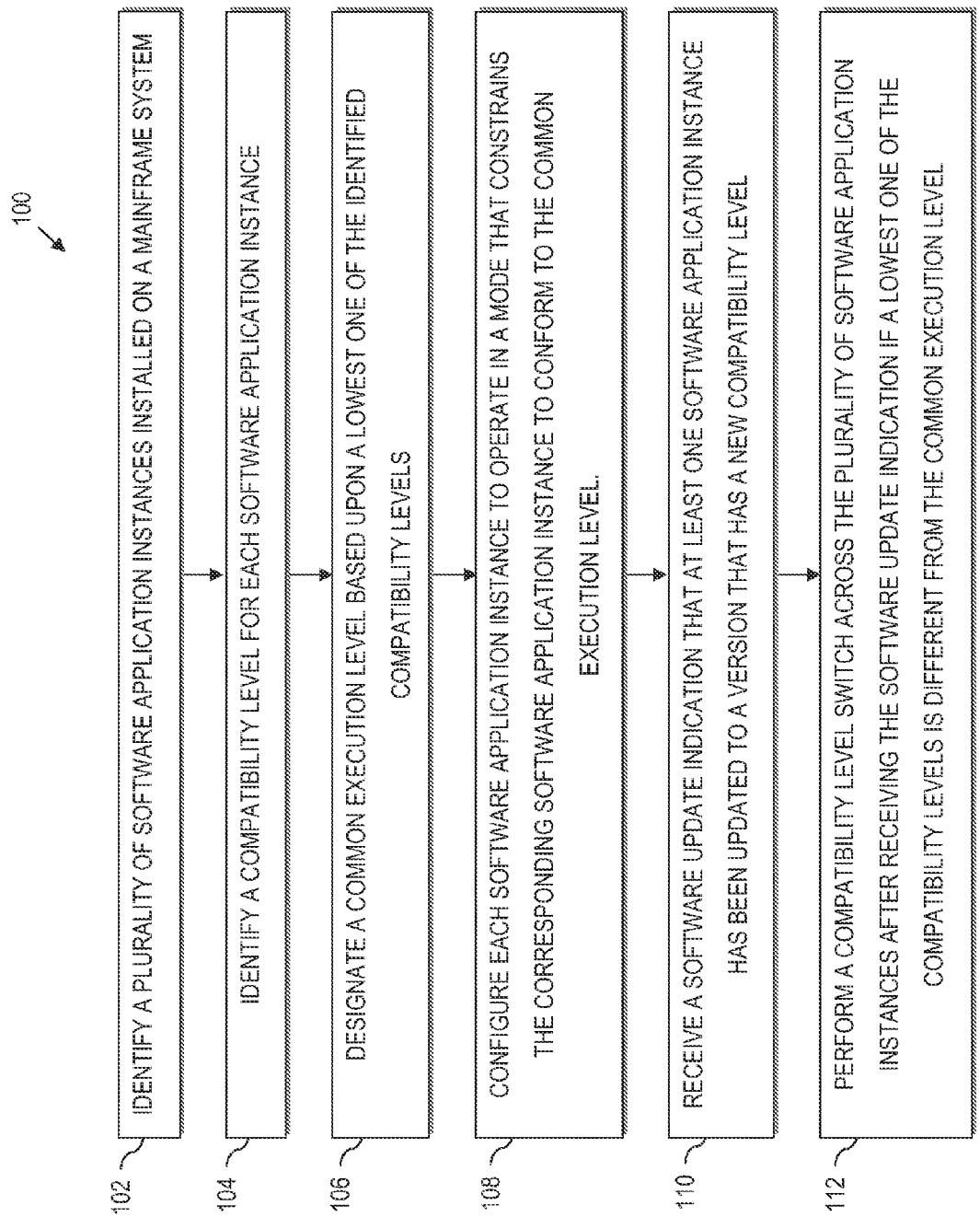
FIG. 1 is a flow chart illustrating a dynamic release control according to aspects of the present disclosure.

Dynamic Release Control:

Referring now to the drawings and in particular to FIG. 1, a process 100 for dynamic release control is illustrated. The process 100 includes identifying at 102, a plurality of software application instances installed on a mainframe system. As noted in greater detail herein, a software application can have different software application instances installed within the mainframe system, each software application instance executing (or executable) in a corresponding operating environment.

The process 100 also includes identifying at 104, a compatibility level for each software application instance. Due to the particularities of each operating environment, it is possible for different software application instances to be at different build levels, different versions, different releases, etc. In this regard, the compatibility level corresponds with execution characteristics of the corresponding software application instance. For example, each compatibility level within a given software application may roll out new or different features, functions, enhancements, fixes, implementations, capabilities, requirements, dependencies, etc. As such, each different value of compatibility level represents some change in the software application. In this manner, compatibility levels can change with new builds, patches, or other modifications to the software application.

In certain illustrative implementations, the process 100 may receive a communication from the corresponding software application instance, indentifying its compatibility level, such as where the software application instance has a registration component as will be described in greater detail herein. The registration component may also enable the process to receive information programmed by a software developer, manufacturer, or other party. Alternatively, the process may be able to discover the compatibility level and/or other information of a software application instance.

The process 100 further includes designating at 106, a common execution level based upon a lowest one of the identified compatibility levels. For instance, in an illustrative implementation, a process evaluates the current compatibility level of each software application instance and sets the common execution level equal to the lowest compatibility level.

The process 100 still further includes configuring at 108, each software application instance to operate in a mode that constrains the corresponding software application instance to conform to the common execution level. In this manner, the compatibility level of each software instance is a reflection of the potential capability of that software application instance. In other words, the compatibility level denotes the highest level of eligibility that the software application instance is capable of executing in. However, a software application instance that has a relatively higher compatibility level may be forced to behave according to a different, e.g., lower compatibility. Thus, each software application instance should be backwards compatible (or otherwise capable of operating in a backwards compatible mode).

The process 100 yet further includes receiving at 110, a software update indication that at least one software application instance has been updated to a version that has a new compatibility level. In this manner, each updated software application instance, when executed, continues to conform to the common execution level after the corresponding update.

The process 100 also includes performing at 112, a compatibility level switch across the plurality of software application instances after receiving the software update indication if a lowest one of the compatibility levels is different from the common execution level. A compatibility switch includes adjusting the common execution level based upon the lowest one of the compatibility levels. The compatibility switch also includes reconfiguring each software application instance to operate in a mode that constrains the corresponding software application instance to conform to the adjusted common execution level. The compatibility switch may be implemented by automatically executing the compatibility switch after receiving the software update indication if a lowest one of the compatibility levels is different from the common execution level. Alternatively, a system programmer or other user may implement the compatibility switch at a user-desired time. As another example, the process may execute at least one policy rule that determines when to perform the compatibility switch.

By way of illustration, a software application (Product A) may have three instances, Product A-1 Version 1 COMPAT 1; Product A-2 Version 1 COMPAT 1; and Product A-3 Version 1 COMPAT 1. In this example, all three instances of the software application Product A, are at a compatibility level of COMPAT 1. In this trivial case, the dynamic release control identifies the three instances of PRODUCT A, identifies the COMPAT level for each instance is at COMPAT 1, and designates the common execution level to be equal to COMPAT 1.

Now at some later time, assume that software application instance Product A-1 is updated to Version 2, which adds a first new feature, which correspondingly raises its compatibility to COMPAT 2. The dynamic release control receives a software update indication that PRODUCT A-1 is now capable of Version 2 operating mode. However, because Product A-2 and Product A-3 are still at COMPAT 1, the common execution level remains at COMPAT 1. As such, the dynamic release control configures Product A-1 to operate in a mode that is constrained to conform to the common execution level of COMPAT 1. Thus, PRODUCT A-1 behaves as if it were Version 1 software. That is, the new functionality of COMPAT 2 is switched OFF in PRODUCT A-1. Here, the new feature of Version 2 is installed for PRODUCT A-1, but is unavailable for use. In this example, a lowest one of the compatibility levels (i.e., highest common compatibility level) is not different from the common execution level, so no compatibility level switch is performed. Assume next that Product A-2 is updated to Version 2. Then, PRODUCT A-2 is updated to Version 3 that adds a second new feature and is thus capable of COMPAT 3. A similar process to that set out above, applies when Product A-2 is updated.

Keeping with the above example, assume next that PRODUCT A-3 is updated to Version 2. Thus, PRODUCT A-1 and PRODUCT A-3 are at COMPAT 2, whereas PRODUCT A-2 is at COMPAT 3. The dynamic release control receives a software update indication that PRODUCT A-3 has been updated to a version that has a new compatibility level (COMPAT 2 in this example). A lowest one of the compatibility levels (now COMPAT 2) is different from the common execution level (currently at COMPAT 1). As such, the dynamic release control can implement a compatibility level switch. To perform the compatibility level switch, the dynamic release control adjusts the common execution level based upon the lowest one of the compatibility levels (thus the common execution level is now set to COMPAT 2). The dynamic release control also reconfigures each software application instance to operate in a mode that constrains the corresponding software application instance to conform to the adjusted common execution level. Thus, PRODUCT A-1, PRODUCT A-2 and PRODUCT A-3 are all "switched on" to COMPAT level 2 (thus the first new feature is available). Here, the second new feature of Version 3 is still unavailable, even though it is installed in PRODUCT A-2.

The dynamic release control thus allows a system programmer to "stage" software updates across software instances at different times. Notably, different computers within a given mainframe system may have limited and/or different down times, e.g., due to operating system requirements, usage, location, demand for resources on the system, etc. However, the system programmer is able to turn on features across instances at the same time. The system programmer can likewise turn off features by rolling back to lower COMPAT levels, e.g., by adjusting the common execution level. This approach can lead to increased rate of new feature roll-out because small programming enhancements, patches, etc., can be installed in stages, then turned on across all software application instances in an automated or semi-automated manner.

As will be described in greater detail herein, the process 100 may further include identifying a plurality of subcomponents for each software application instance. Here, a compatibility level for each software application instance may be identified by identifying a compatibility level of each subcomponent of the software application instance, by identifying a lowest compatibility level among the identified plurality of subcomponents, and by establishing the compatibility level of the software application instance as the identified lowest compatibility level among the identified plurality of subcomponents.

The process 100 may also include identifying at least one software application dependency (e.g., a related software application, driver, service, etc., which shares a resource, library, feature, structure, etc.) associated with a corresponding one of the plurality of software application instances and identifying a compatibility level for each identified software application dependency. Here a compatibility level for each software application instance is identified by establishing the compatibility level of the software application instance based upon the compatibility level of the software instance and each identified software application dependency, e.g., as a lowest compatibility level among the software application instance and each identified software application dependency.

The process 100 may also implement other functions, such as providing a graphical user interface that allows a user to selectively control when the compatibility level switch is performed. Moreover, the process 100 may store for each software application instance that has been updated at least once or has at least one pending update ready for installation, an installation library comprising a backout file in order to restore the software application instance back to a previous version, a backout policy flow requirement to direct a restore of the software application instance back to a previous version, an upgrade policy flow to direct an update to a new version of the software application instance and a capability pending file that stores the capabilities available for a compatibility level that is higher than the common execution level, as will be described in greater detail herein. Here, the process may automatically verify that the backout file, the backout policy flow requirements and the upgrade policy requirements are in place on the mainframe system to support an implemented upgrade of a software application instance before performing the compatibility level switch.

The process 100 may be implemented, for instance, as computer-readable hardware that stores machine-executable program code for performing dynamic release control, where the program instructs a processor to implement the described process. The process 100 may also be implemented in a system, e.g., which includes a processor coupled to memory where the memory stores instructions, which when executed by the processor, perform the described process. Also, the process 100 may be implemented as a machine-executable process in a mainframe system.

Figure 2:
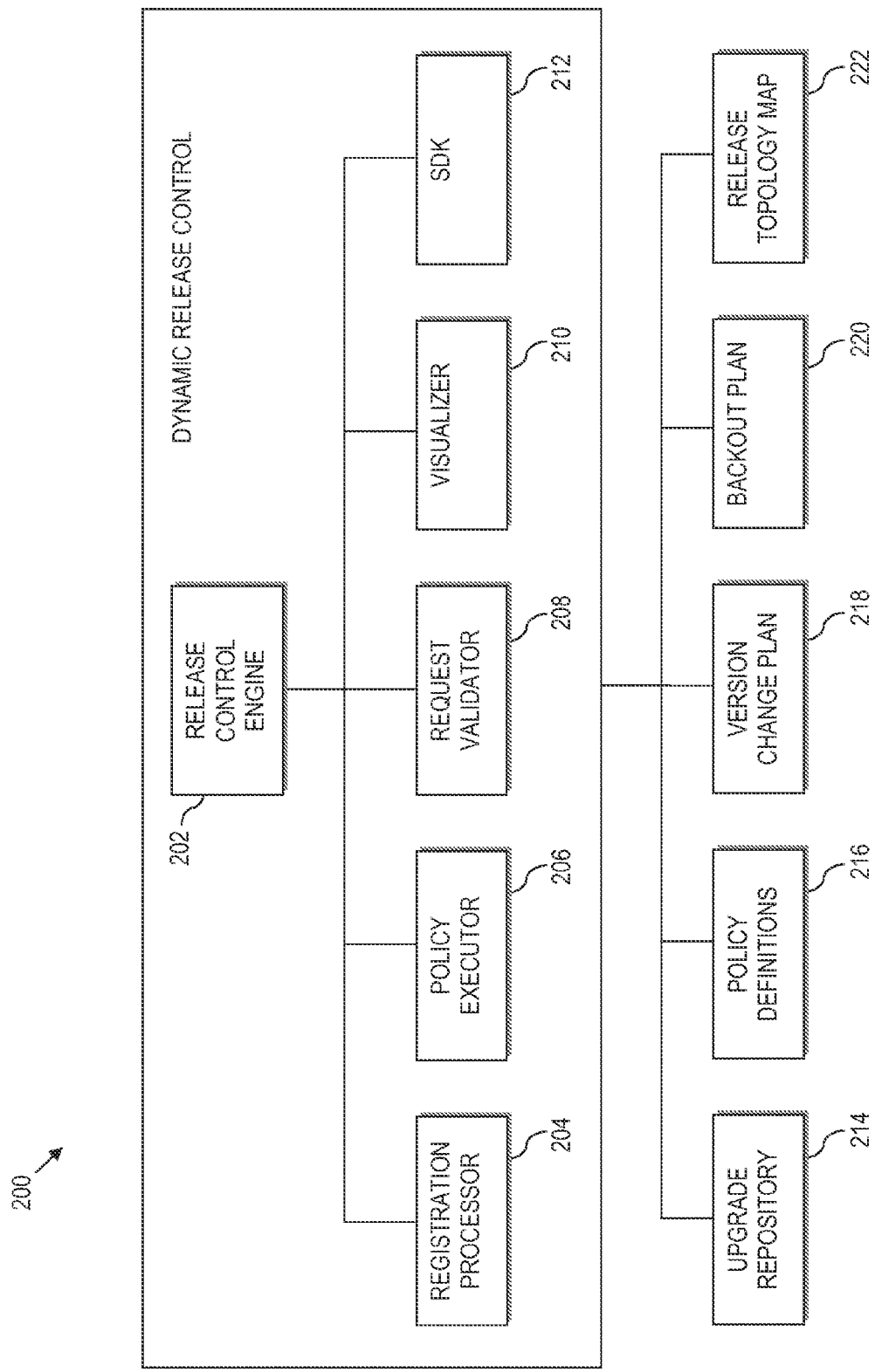
FIG. 2 is a block diagram of a dynamic release control according to aspects of the present disclosure herein.

System Overview:

Referring to FIG. 2, a dynamic release control 200 is illustrated according to various aspects of the present disclosure herein. The dynamic release control 200 may be utilized to implement the process 100 described with reference to FIG. 1, and thus, may also be implemented as computer-readable hardware that stores machine-executable program code that instructs a processor to implement the described dynamic release control 200. The dynamic release control 200 may also be implemented in a system, e.g., which includes a processor coupled to memory where the memory stores instructions, which when executed by the processor, implements the dynamic release control 200.

More particularly, according to aspects of the present disclosure, the dynamic release control 200 functions as a compatibility service, performing roles as an administrator for the tracking, maintenance and installation of software executing on a mainframe system. In general, the dynamic release control 200 builds metadata describing software applications that are running on a corresponding mainframe system. For instance, the metadata may include version information, compatibility information, build information, and other operating requirements for software applications being tracked by the dynamic release control 200.

The dynamic release control 200 also stores installation information including the installation files and related data for one or more versions of each software application instance that is being tracked. Moreover, the dynamic release control 200 includes necessary cross-system communication capabilities for managing information across multiple platforms included in the mainframe system. As such, instances of a software application running on different platforms within the mainframe system can all be managed by the dynamic release control 200. Thus for example, dynamic release control 200 can manage and coordinate the updating of software application instances in Windows operating system(s), Unix system(s), z/OS system(s) or other operating systems, across one or more computers, including mainframe computers, etc. In this manner, the dynamic release control 200 can handle execution of the software updates (i.e., perform the updates), or the dynamic release control 200 can manage data related to the results of updates, e.g., where the system programmer or some other source manages one or more aspects of a software update.

The dynamic release control 200 verifies that requirements are in place to perform a version change of a software application. The dynamic release control further prepares a rollback plan to undo the version change if desired. As noted with regard to the process 100 of FIG. 1, the dynamic release control 200 can "queue up" version changes without actually implementing the changes (e.g., by installing updates without turning on the new features of those new features through use of compatibility levels). In this manner, a system programmer can utilize the dynamic release control 200 to facilitate when to perform the actual version change, thus allowing a version change to be implemented across multiple instances of the software application (on the same or different mainframe computers and on the same or different platforms/operating systems, etc.) in the same update process or across multiple processes as the system programmer desires. This allows the system programmer to implement system-wide rollout with automated safeguards that the software version change will be compatible and operable across all platforms supported in the mainframe system.

In an exemplary model according to aspects of the present disclosure, the dynamic release control 200 includes components that (at least) conceptually define a release control engine 202, a registration processor 204, a policy executor 206, a request validator 208 and a visualizer 210. The dynamic release control 200 may also include a software development kit 212 as will be discussed in greater detail herein.

The dynamic release control 200 also includes an upgrade repository 214 and a set of policy definitions 216. Still further, the dynamic release control 200 may generate a version change plan 218, a back-out plan 220, a release topology map 222, or other features that facilitate the software release management, installation or combinations thereof, which can be inspected and/or controlled by a system programmer.

In an illustrative implementation, the release control engine 202 is responsible for developing a plan for implementing a version change for a corresponding software application. Where a corresponding mainframe system includes multiple platforms and/or mainframe computers (collectively, executing environment), the release control engine 202 can manage separate plans for the rollout of the new software version that is appropriate for the associated executing environment. The release control engine 202 also develops a back-out plan (for each executing environment) in case a decision is made to revert back to the current state of the mainframe system.

Still further, the release control engine 202 automates the implementation of a version change. For instance, the release control engine 202 may utilize dynamic release control statements to enable functionality of software applications at a designated level in an automated or manual manner. Thus, the release control engine 202 can "prepare" a software application for a version change on multiple mainframe systems by individually preparing each software application instance for the version change on its corresponding mainframe computer. When all software application instances across all mainframe computers targeted for the version change are verified to be compatible for the version change, a dynamic release control statement can "switch on" the version change across all targeted mainframe computers such that all software application instances are modified in a single activity.

In this regard, the utilization of the dynamic release control 200 facilitates the ability for a system programmer to implement new software releases, manage and control incremental builds etc., according to a planned schedule, one or more systems at a time, one or more platforms at a time, etc.

In an exemplary implementation, the release control engine 202 is responsible for receiving a version update associated with an identified instance of a software application executing on a mainframe system and for identifying a compatibility level associated with the received version update. The release control engine 202 is also responsible for identifying version change requirements to implement a change to the received version of the software application instance and for automatically verifying that the identified version change requirements are in place on the mainframe system to support the received version of the software application instance. As an example, the release control engine 202 can develop a version change plan 218 for implementing the change to the selected version and automatically verify that the identified version change requirements are in place on the mainframe system to support the selected version of the software application.

The release control engine 202 is also responsible for identifying drop-back requirements in order to restore the software application instance back to its current version and for automatically verifying that the identified drop-back requirements are in place on the mainframe system to support a drop-back to a current version of the software application. As an example, the release control engine 202 may develop a back-out plan 220 by identifying drop back requirements in order to restore the software application back to its current version or other previous, and automatically verify that the identified drop back requirements are in place on the mainframe system to support the drop back. Once all the requirements have been verified, the release control engine 202 can implement the version change on the mainframe system. More particularly, the release control engine 202 is responsible for comparing the identified compatibility level of the received version update with the compatibility level of each instance of the software application executing on the mainframe.

As described in greater detail herein, the release control engine 202 refrains from switching on the new compatibility level features if at least one instance of the software application on the mainframe system has a compatibility level lower than the identified compatibility level of the received version update. However, the release control engine switches on the new compatibility level features if the compatibility level of each instance of the software application is at least as high as the new compatibility level of the received version update.

In order for the release control engine 202 to perform the above-described verification of requirements, the release control engine 202 may utilize the registration processor 204 to interact with the various software components on the mainframe system, e.g., to discover the installed components and to register the mainframe system components and their dependencies in the upgrade repository 214. The release control engine 202 also interacts with the registration processor 204 at the time of a version change to update the upgrade repository 214 to reflect the current state of the mainframe system.

The release control engine 202 may also interact with the policy executor 206. The policy executor 206 interacts with the set of policy definitions 216 to define functionality related to operation of the dynamic release control 200. For instance, policies may be used to implement rules that characterize the relationships, dependencies, requirements, etc., related to version compatibility within the mainframe system. The policies may also define when to perform level changes, version upgrades, etc. In an exemplary implementation, the policy executor 206 may facilitate use of a policy language to define the interactions that have to be validated against in order to implement an update. For instance, policy rules may indicate that software application 'A' is incompatible with software application 'B'. As another example, a policy may indicate that software application 'A' release 3.0 is only compatible with software application C release 4.0-5.3 (or any other range). Another example policy may indicate that software application 'A' must be upgraded to version 5.0 before software application B can be upgraded to version 9.0.

During the verification processes, the release control engine 202 may interact with the request validator 208, which is responsible for performing the verification of the developed version change plan 218 and the back-out plan 220.

The visualizer 210 can provide a dashboard or other graphical user interface to allow a system programmer to interact with the dynamic release control 200. In the illustrative implementation, the visualizer 210 generates the release topology map 222, which provides a visual representation of the software components, their versions and compatibility. The visualizer 210 can also present a user-interface to the system programmer, allowing the system programmer an opportunity to define, edit or otherwise modify a version change plan or drop-back plan. The visualizer 210 may also provide a user interface that allows the system programmer an opportunity to construct, edit or otherwise modify compatibility models, build dependencies against a software application, etc. This may be accomplished for instance, by allowing the system programmer to create, edit or delete policy definitions 216.

Figure 3:
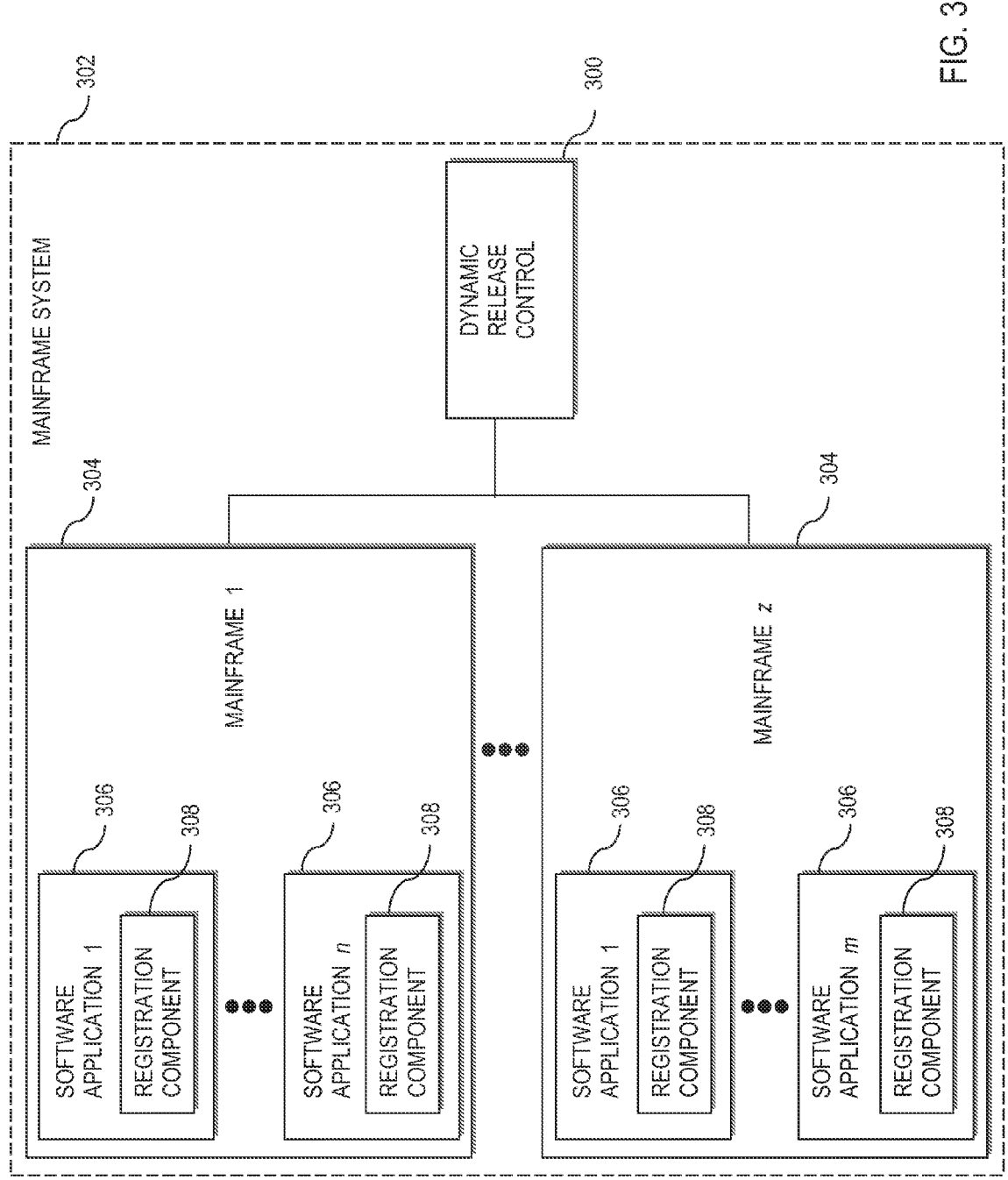
FIG. 3 is a block diagram of a dynamic release control in a mainframe system, according to further aspects of the present disclosure herein.

Referring to FIG. 3, a mainframe system is illustrated according to an exemplary implementation of the present disclosure. The mainframe system includes a dynamic release control 300 that services at least one mainframe computer 304 within a mainframe system. In this regard, the dynamic release control 300 is analogous to the dynamic release control 200 described with reference to FIG. 2 and can be used to implement the process 100 of FIG. 1. Moreover, the dynamic release control 300 may be implemented on a mainframe computer (or distributed across multiple mainframe computers) within the mainframe system 302.

For instance, there are "z" mainframe computers 304 within the mainframe system 302 where z is any integer greater than or equal to 1. As noted above, each mainframe computer 304 may be a physical machine or a virtual machine and may be co-located or distributed relative to any other mainframe computers 304 within the mainframe system 302. Each mainframe computer 304 includes one or more software applications 306. In the illustrated system, a first mainframe computer 304 (also designated MAINFRAME 1) includes "n" software applications 306 where n is any integer greater than or equal to one. Analogously, a zth mainframe computer 304 (also designated MAINFRAME z) includes "m" software applications 306 where m is any integer greater than or equal to one.

As used herein, the term "software application" is meant to include a software component that is installed on a mainframe system that is to be managed by the dynamic release control 300, e.g., a program, monitoring tool, process, object, service, function, layer, driver, interface, etc., which may be executing at the user-level, as a tool for the system programmer, at the operating system level, hardware control level, etc.

Each software application 306 includes a corresponding registration component 308. The registration components 308 interact with the dynamic release control 300 to enable the performance of the dynamic control and management of software application version changes. In an illustrative example, the dynamic release control communicates with a registration component integrated with each software application instance to receive information programmed by a developer of the software application instance. As such, the software applications 306 are also referred to herein generally as dynamic release control-enabled applications.

For instance, with reference to FIGS. 1-3 generally, in an illustrative implementation, a registration component 308 of a corresponding software application 306 interacts with the registration processor 204 to register the software application 306 with the dynamic release control 300. This allows the dynamic release control 300 to discover the software applications 306 on a corresponding mainframe system 302. The system periodically obtains alternate versions of the software applications 306, e.g., in the form of new releases, service packs, patches, fixes, incremental builds, small programming enhancements, etc., which are stored in the upgrade repository 214.

In an illustrative implementation of the present disclosure, each software application instance registers version information with the dynamic release control 300. For instance, the registration component 308 of each software application 306 may utilize actionable automation intelligence to register its operating system release (designated herein as 'RELEASE') and product level compatibility (designated herein as 'COMPAT') level. In practice, the registration component 308 may communicate to the dynamic release control 300, any suitable version, interoperability, compatibility or other information, including level, schema, release number, etc.

In operation, the dynamic release control 300 brokers the highest common supported COMPAT level among software applications having dependencies. As the common COMPAT level increases, new inter-product capability can then be enabled based on a user set policy, e.g., as stored in the set of policy definitions 216 managed by the policy executor 206. Moreover, by providing a user interface to the dynamic release control 300, a system programmer can set rules in the set of policy definitions 216 that enable version changes to occur automatically, manually, e.g., by a system programmer triggering a user-defined update, or the operation of the dynamic release control 300 can be suspended. This allows the delivery of incremental updates instead of the traditional approach of waiting for a major release to roll out version changes. Thus, new functions and features implemented as small programming enhancements can be delivered to active run-time environments much faster and more reliably than in conventional systems.

Still further, the dynamic release control 300 can make the RELEASE and COMPAT level information for each software application instance available to the system programmer for inspection. The RELEASE and COMPAT level information can also be utilized to drive upgrade and back-out policies. Because the dynamic release control 300 is responsible for management across the entire mainframe system, enterprise-wide RELEASE and COMPAT management of software applications is possible in an automated manner, thus allowing intra-product and inter-product, intra-system and inter-system and intra-platform and inter-platform upgrades, downgrades, cross-grades, etc.

If a version change is implemented, the dynamic release control engine 202 builds a back-out plan 220. The back-out plan defines a map for implementing a conditional back-out of a version change. In order to implement the back-out plan, the release control engine 202 may back up necessary files to restore the mainframe system back to its default (current) state or take other actions. For example, the release control engine 202 may automatically back up parameter libraries, control files, database(s), etc.

According to further aspects of the present disclosure, the dynamic release control 200, 300 can be implemented as a stand-alone application, or the dynamic release control 200, 300 can be implemented as components of other system programmer disciplines. For instance, health check applications can be extended to encompass any oversights in the dynamic release control operation. Still further, a system programmer dashboard, visualization tool, mainframe management tool, etc., can be expanded to incorporate features of the dynamic release control 200, 300.

Moreover, a system programmer, applications developer or other software provider can utilize the software development kit 212 to develop a custom registration component 308 so that proprietary mainframe software applications, legacy mainframe software applications, etc., can integrate with the dynamic release control 200, 300.

The dynamic release control as described more fully herein, helps to eliminate human error through intelligent automated software processes distributed through mainframe products. Moreover, in an illustrative implementation, instead of relying upon a system programmer to know and understand the compatibility issues around software applications on a mainframe system, the burden can be offloaded to software developers, that provide the necessary compatibility requirements to the dynamic release control 200, 300, e.g., by embedding the appropriate metadata in the registration component 308 to be passed to the upgrade repository 214 as described more fully herein. That is, the various software developers (e.g., the team that develops the schema) can integrate into the registration component 308 of a corresponding software application 306, the necessary information, e.g., RELEASE, COMPAT level and other data to coordinate and track product upgrades across the enterprise encompassing the mainframe system.

Figure 4:
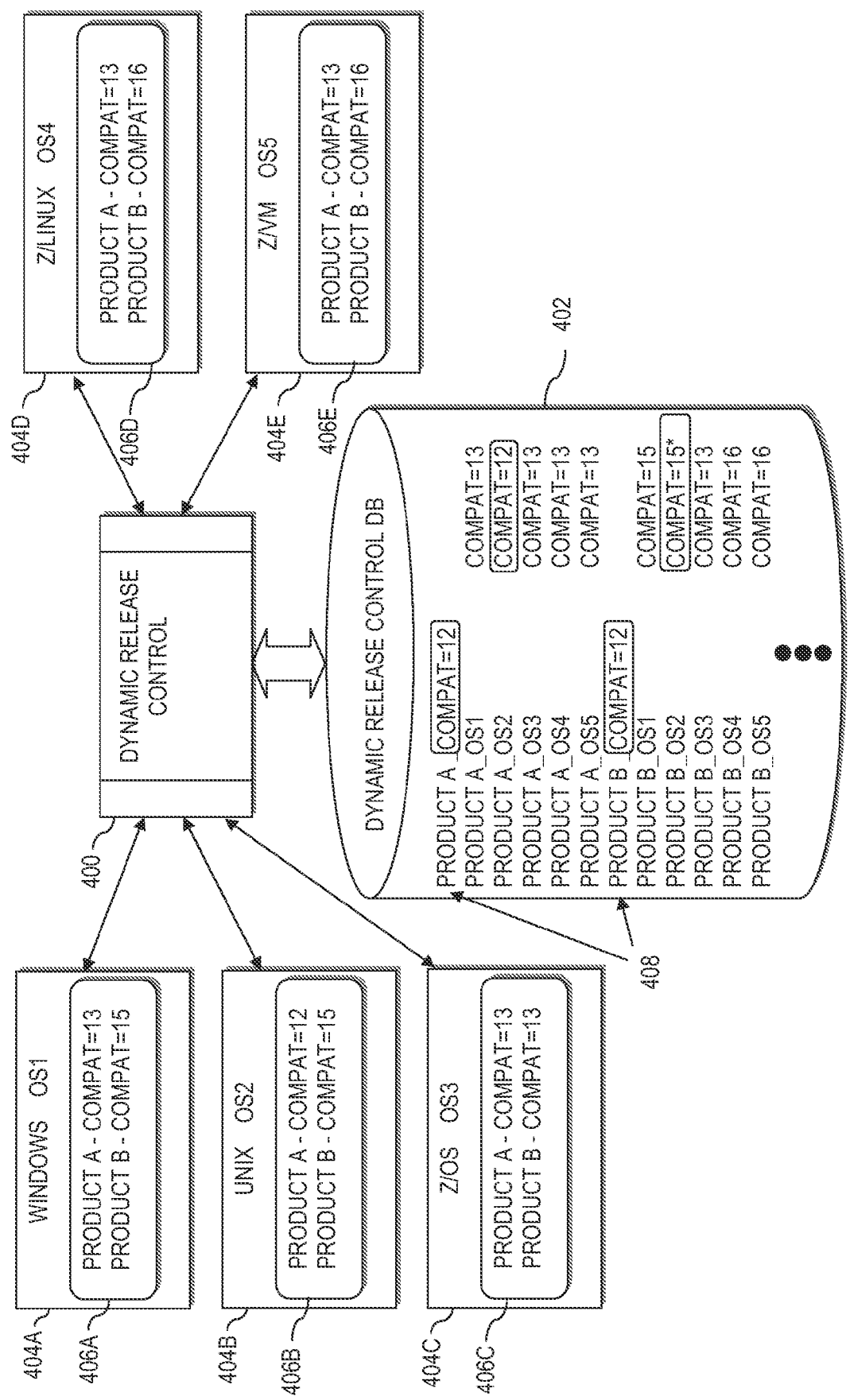
FIG. 4 is a block diagram illustrating software application instances on different platforms within a mainframe system, where each executing instance of the software application has a compatibility level set to the lowest compatibility level of the software application instances, according to aspects of the present disclosure herein.

Automated Upgrade Example:

Referring to FIG. 4, a block diagram illustrates a dynamic release control 400, which is analogous in features to one or more of the process 100 of FIG. 1, the dynamic release control 200 of FIG. 2 or the dynamic release control 300 of FIG. 3, as described in greater detail above. In an exemplary implementation, the dynamic release control 400 may be implemented as part of a system programmer discipline (e.g., mainframe management software). The exemplary dynamic release control 400 interacts with a dynamic release control database 402 (e.g., stored within the upgrade repository 214 as described with reference to FIG. 2) to track version information, as will be described below.

The dynamic release control 400 also interacts with various platforms of a corresponding mainframe system in a manner analogous to that set out in greater detail herein. In a first illustrative example, each exemplary platform 404A-404E executes a software application instance, identified as Product A for purposes of example. A registration component in each instance of Product A registers the corresponding compatibility requirements 406A-406E, e.g., COMPAT level with the dynamic release control 400. In the illustrative example, the Windows platform 404A (OS1), the z/OS platform 404C (OS3), the z/Linux platform 404D (OS4), and the z/VM platform 404E (OS5) are all "queued up" for COMPAT 13. However, the Unix platform 404B only shows a COMPAT of 12. The dynamic release control designates a common execution level based upon a lowest one of the identified compatibility levels. As such, the dynamic release control sets the compatibility level of each instance of Product A instance across all platforms 404A-404E to COMPAT 12, as illustrated in the dynamic release control database 402. As illustrated, a common execution level 408 is set to COMPAT 12 in this example, since COMPAT 12 is the lowest common compatibility level among the software application instances of Product A. Another way to look at it is that COMPAT 12 represents the highest common denominator among the COMPAT levels associated with the Product A instances.

In an illustrative implementation, each of the COMPAT 13 instances of Product A (on platforms 404A, 404C, 404D and 404E) emulate, downgrade, mimic, configure or otherwise conform to common execution level COMPAT 12 until the COMPAT associated with platform 404B is upgraded to COMPAT 13.

Here, the dynamic release control 400 refrains from turning on the changes in COMPAT 13 over COMPAT 12 for the software application instances of Product A on platforms 404A, 404C, 404D and 404E because one instance of the software application on the mainframe system (Product A on platforms 404B) still has a COMPAT 12.

Figure 5:
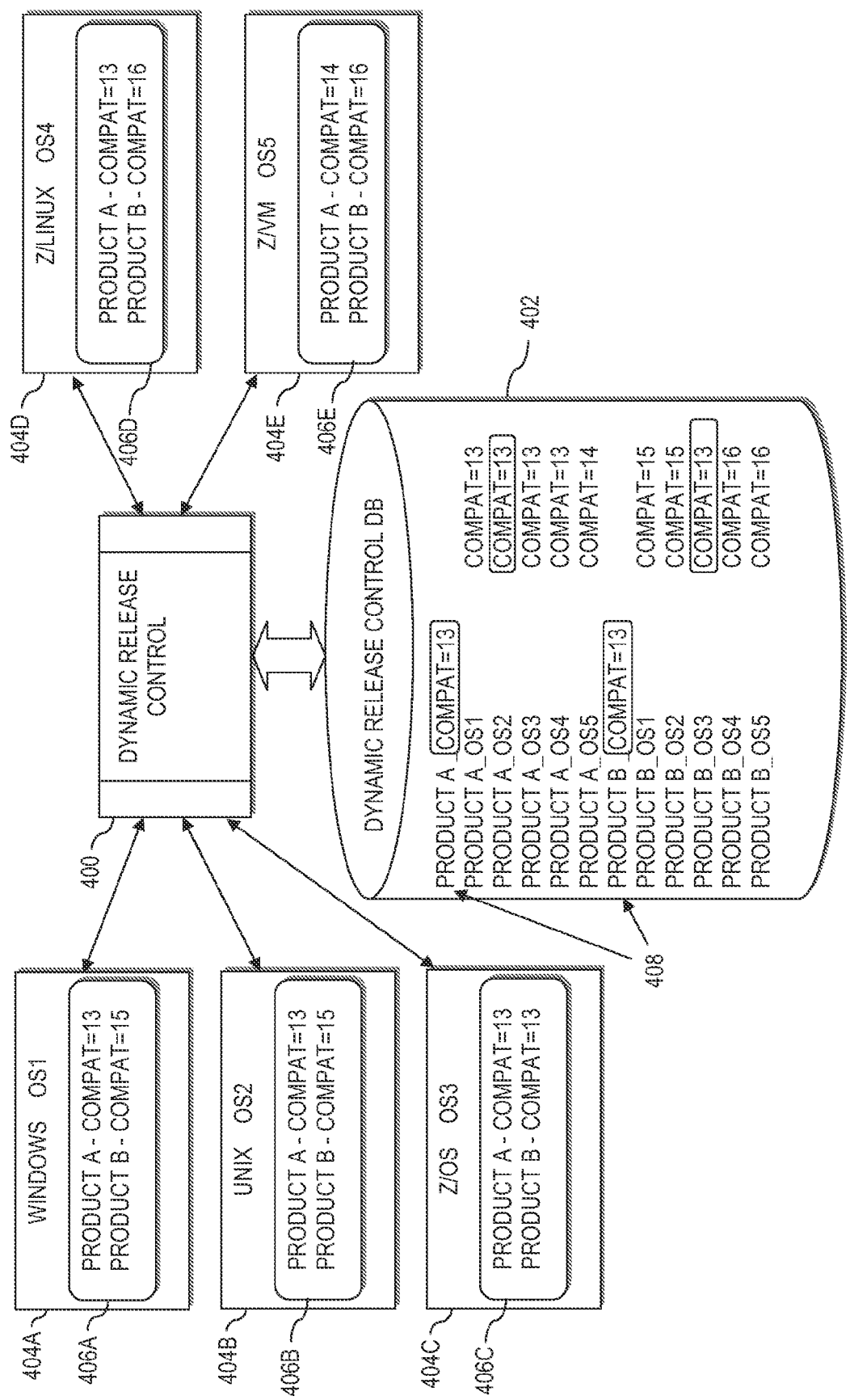
FIG. 5 is a block diagram of the system of FIG. 4 where all software application instances are updated in response to the lowest compatibility level being updated to a higher compatibility level, according to aspects of the present disclosure herein.

Referring to FIG. 5, at some future time, the platform 404B receives an update for the software application Product A, which is ultimately installed. The dynamic release control compares the compatibility level of the received version update (Product A on platforms 404B is now COMPAT 13) with the compatibility level of each instance of the software application executing on the mainframe (all instances are now at COMPAT 13). In this manner, the process turns on the new features of COMPAT 13 across all instances of PRODUCT A. Moreover, the process updates the common execution level to COMPAT 13.

Thus for example, assume that Product A on platform 404E were updated to COMPAT 14 before Product A on platform 404B were updated to COMPAT 13. In this example, at the time of a rollout in response to Product A on platform 404B updating to COMPAT 13, then each Product A instance rolls out to COMPAT 13 (even the instance of Product A of platform 404E, despite being capable of rolling out to the higher COMPAT 14).

Thus, the dynamic release control performs a new feature roll-out at a time designated by the system programmer so that all versions of Product A are updated to COMPAT 13. As noted in FIG. 5, the dynamic release control database 402 is updated to reflect that the common execution compatibility level for the Product A software application is COMPAT 13.

As another illustrative example, with reference to FIGS. 4 and 5 generally, assume Product B has Product A as a dependency. In this example, the compatibility level of Product B is ties to the compatibility level of Product A as well. A policy can be used to define any desired relationship between a software application instance and its dependencies. For instance, a rule may be used to set the compatibility level based upon the compatibility level of the software instance and its dependencies. Moreover, each software application instance need not have the same dependencies as other software application instances.

A simple example is presented for clarity of the principle. As FIG. 4 illustrates, the lowest compatibility level of a Product B instance is COMPAT 13. However, since Product B is dependent upon Product A, the common execution level for Product B is set to 12 because the highest common compatibility level between Product A and Product B is COMPAT 12 (Product A on the Unix system OS2 in this example). Referring to FIG. 5, after the update to Product A on the Unix platform 404B (OS2), the common execution level of Product B is brought up to COMPAT 13, in a manner as described more fully herein. As noted above, other rules may alternatively be used to set the compatibility level when there are dependencies.

In this manner, the system programmer can gradually roll out new versions of software applications for each platform because the actual executing instance is not updated. Rather, the dynamic release control 300 is updated to reflect that the corresponding platform is "ready" for the upgrade. One all platforms are updated to the same level (and the installations have each been verified) then the system programmer can dynamically turn on the new features associated with the new compatibility level.

Dashboard View:

Referring to FIGS. 6A and 6B, an exemplary dashboard is illustrated for managing a dynamic release control, according to aspects of the present disclosure. FIG. 6A shows the current status of the execution libraries (the version of the software application currently executing on the mainframe system). FIG. 6B illustrates the most recent installation libraries that are available for each software application.

As illustrated, a "system view" tab 602 is selected allowing a system programmer to view a plurality of software applications (under the System Name column). For each software application, a COMPAT status is provided, as well as information about current execution libraries for software application instances. In the illustrated example, all instances of Product A, Product B, Product D and Product E are at the same COMPAT level, thus the status is a check mark. However, at least one instance of Product C has a different COMPAT level compared to the other instances of Product C. Likewise, at least one instance of Product F a COMPAT level compared to the other instances of Product F.

As noted specifically in FIG. 6B, the installation libraries section stores for each software application instance that has been updated at least once or has at least one pending update ready for installation, an installation library comprising a backout file in order to restore the software application instance back to a previous version, a backout policy flow requirement to direct a restore of the software application instance back to a previous version, an upgrade policy flow to direct an update to a new version of the software application instance and a capability pending file that stores the capabilities available for a compatibility level that is higher than the common execution level. Here, a process of the dynamic release control may automatically verify that the backout file, the backout policy flow requirements and the upgrade policy requirements are in place on the mainframe system to support an implemented upgrade of a software application instance before performing the compatibility level switch.

In this example, Product C and Product F each have a warning (circle with an X) for its COMPAT status. Comparing FIG. 6A and 6B, Product C has at least one instance at Build 12/COMPAT 12 that can be updated to Build 13/COMPAT 13. Likewise, Product F has at least one instance at Build 16/COMPAT 16 that can be updated to Build 17/COMPAT 17.

With reference to FIG. 6A and 6B together, a system programmer can click on a link to view the back-out plan generated by the dynamic release control for the currently executing versions of the software applications. The system programmer can also click on a link to view the back-out plan and upgrade policy (version change plan) for the most recent instance of the installation libraries for the corresponding software applications.

Referring to FIGS. 7A and 7B, the dashboard of FIG. 6 illustrates the product view tab 702. The system programmer has clicked on the Product C line item and has changed from the System View tab 602 (FIGS. 6A, 6B) to the product view tab 702 (FIGS. 7A, 7B). For sake of example, the System Programmer now sees that within an instance of the Product C software application, there are three sub components, i.e., SUB 1, SUB 2 and SUB 3. One component (SUB 3) is executing at a lower COMPAT level 12 compared to the version of SUB 3 available in the installation libraries of COMPAT level 13. Moreover, SUB 1 and SUB 2 are already at COMPAT 13. The dynamic release control identifies a compatibility level of each subcomponent of the software application instance (SUB 1=COMPAT 13, SUB 2=COMPAT 13 and SUB 3=COMPAT 12) in this example. The dynamic release control identifies a lowest compatibility level among the identified plurality of subcomponents (SUB 3=COMPAT 12) and establishes the compatibility level of the software application instance Product C as the identified lowest compatibility level among the identified plurality of subcomponents (COMPAT 12 in this example).

As such, the, the dynamic release control only needs to upgrade SUB 3 to bring the entire Product C software application instance up to COMPAT 13. An analogous process can be implemented to update SUB 2 for software application instance Product F.

Once all COMPAT levels are the same, the dynamic release control can dynamically turn on the features of the new COMPAT level.

As illustrated by the example dashboards of FIGS. 6A, 6B, 7A and 7B, an enterprise identifier can be used to track COMPAT levels. In an example, a hierarchy of Platform, Discipline, Security, Storage, etc. can be used to logically organize relevant dynamic release control metadata. Also, as illustrated, in exemplary implementations, all subcomponents must be rolled up before an overall software application can be rolled up to a new version.

The dashboard of FIG. 6A, 6B, 7A and 7B demonstrate the flexibility in displaying COMPAT levels according to hierarchy, e.g., by product. The dashboard also provides visibility to any pending COMPAT levels. The dashboards also provide embedded URLs that will launch the user to the needed information, e.g., to view/edit back-out files, back-out policies, upgrade policies, pending capabilities added into the new version, etc. The information for each field in the dashboard can be provided directly by the software provider via the registration component of the software application. The dashboard will increase system programmer productivity so they can focus time elsewhere and enables customer management to view the product upgrade progress. The dashboard contents can also be uploaded to the software developer for support and debugging. The software developer can also use the dashboard information to track the licenses and use of its software products.

Figure 8:
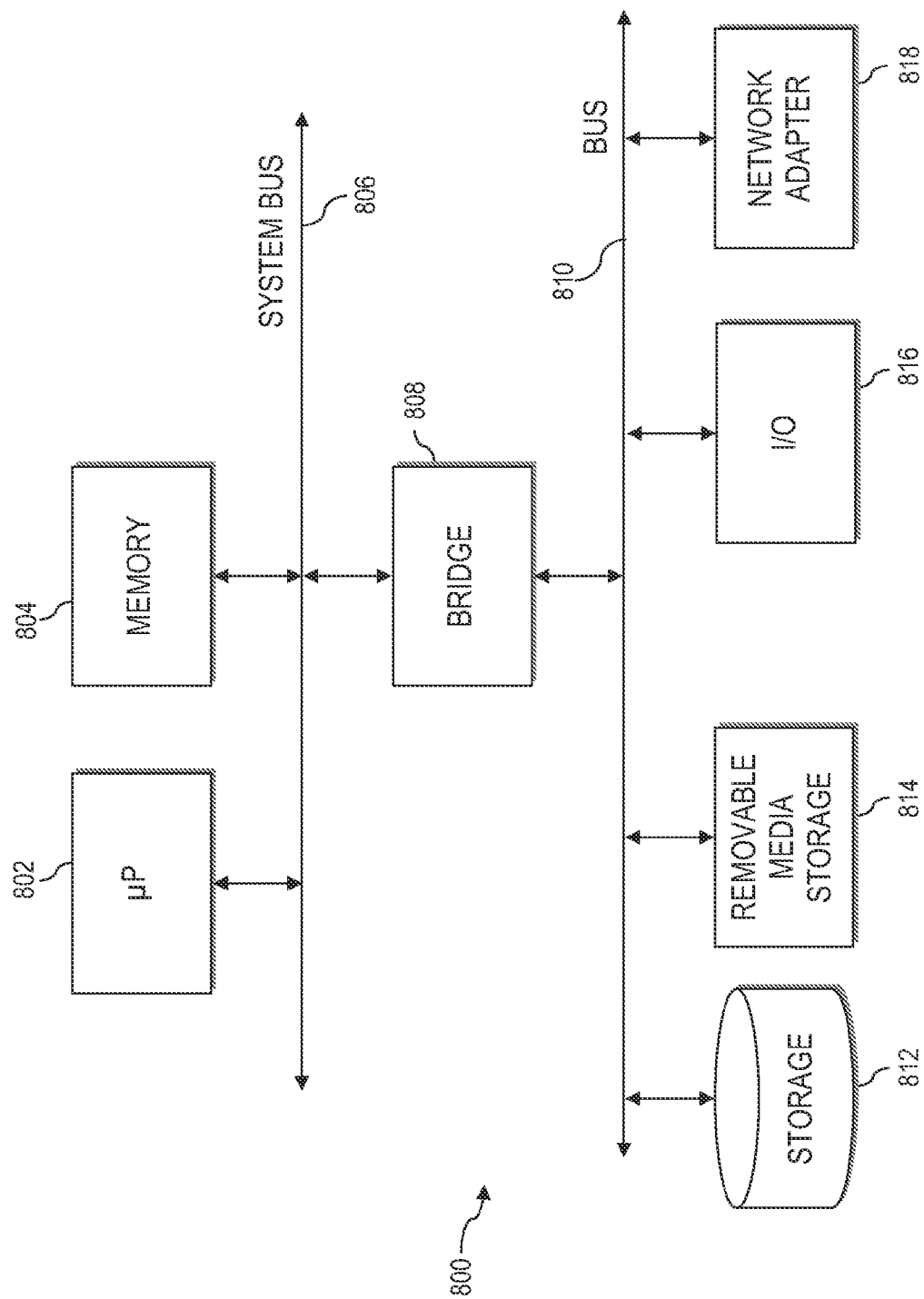
FIG. 8 is a schematic of a computer system comprising computer readable program code stored in computer readable hardware for executing any aspects described herein, according to various aspects of the present disclosure.

Miscellaneous:

Referring to FIG. 8, a schematic of an exemplary computer system having computer readable program code for executing any aspects described herein with regard to FIG. 1-FIG. 7B is illustrated. The computer system 800 includes one or more microprocessors 802 that are connected to memory 804 via a system bus 806. A bridge 808 connects the system bus 806 to an I/O Bus 810 that links peripheral devices to the microprocessor(s) 802. Peripherals may include storage 812, such as a hard drive, removable media storage 814, e.g., floppy, flash, CD and/or DVD drive, I/O device(s) 816 such as a keyboard, mouse, etc. and a network adapter 818. The memory 804, storage 812, removable media insertable into the removable media storage 814 or combinations thereof, can be used to implement the methods, configurations, interfaces and other aspects set out and described herein with regard to FIG. 1-FIG. 7B.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA® (JAVA is a registered trademark of Oracle America, Inc.), Scala, Smalltalk, Eiffel, JADE® (JADE is a registered trademark of Jade Software Corporation Limited), Emerald, C++, CII, VB.NET, PYTHON® (PYTHON is a registered trademark of the Python Software Foundation Corporation Delaware) or the like, conventional procedural programming languages, such as the "c" programming language, Visual Basic, Fortran 2003, Perl, COBOL 2002, PHP, ABAP® (ABAP is a registered trademark of SAP Aktiengesellschaft), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of performing dynamic release control, comprising:
   identifying software application instances on a mainframe system;
   identifying a compatibility level for each identified software application instance, where the compatibility level corresponds with at least one execution characteristic of the corresponding software application instance;
   designating a common execution level based upon a select one of the identified compatibility levels;
   configuring each identified software application instance to conform to the common execution level;
   receiving a software update indication that a select identified software application instance has been updated to a version that has a new compatibility level, where the select identified software application instance, when executed, continues to conform to the common execution level after the corresponding update; and
   performing a compatibility level switch across the identified software application instances after receiving the software update indication if a lowest one of the compatibility levels is different from the common execution level by:
      adjusting the common execution level based upon the lowest one of the compatibility levels; and
      reconfiguring each identified software application instance to conform to the adjusted common execution level.

2. The method of claim 1 further comprising:
   identifying subcomponents for at least one software application instance;
   wherein:
   identifying a compatibility level for each identified software application instance comprises:
      identifying a compatibility level of each subcomponent;
      identifying a lowest compatibility level among the identified subcomponents; and
      establishing the compatibility level of the software application instance as the identified lowest compatibility level among the identified subcomponents.

3. The method of claim 1 further comprising:
   identifying at least one software application dependency associated with a corresponding one of the identified software application instances; and
   identifying a compatibility level for each identified software application dependency;
   wherein:
   identifying a compatibility level for each identified software application instance comprises:
      establishing the compatibility level of the software application instance based upon the compatibility level among the software application instance and each identified software application dependency.

4. The method of claim 1, wherein:
   performing a compatibility level switch across the identified software application instances comprises:
      automatically executing the compatibility switch after receiving the software update indication if a lowest one of the compatibility levels is different from the common execution level.

5. The method of claim 1, further comprising:
   providing a graphical user interface that allows a user to selectively control when the compatibility level switch is performed.

6. The method of claim 1, wherein:
   identifying a compatibility level for each identified software application instance comprises:
      receiving a communication from the corresponding software application instance identifying its compatibility level.

7. The method of claim 1 further comprising:
   storing for each software application instance that has been updated at least once or has at least one pending update ready for installation, an installation library comprising:
      a backout file in order to restore the software application instance back to a previous version;
      a backout policy flow requirement to direct a restore of the software application instance back to a previous version;
      an upgrade policy flow to direct an update to a new version of the software application instance; and
      a capability pending file that stores the capabilities available for a compatibility level that is higher than the common execution level.

8. The method of claim 7 further comprising:
   automatically verifying that the backout file, the backout policy flow requirements and the upgrade policy requirements are in place on the mainframe system to support an implemented upgrade of a software application instance before performing the compatibility level switch.

9. The method of claim 1, wherein:
   performing a compatibility level switch across the identified software application instances comprises:
      executing at least one policy rule that determines when to perform the compatibility switch.

10. The method of claim 1, wherein identifying a compatibility level for each software application instance, configuring each software application instance, and performing a compatibility level switch across the plurality of software application instances further comprise:
    communicating with a registration component integrated with each software application instance to receive information programmed by a developer of the software application instance.

11. The method of claim 1 further comprising:
    queuing up version changes without actually implementing the changes by installing updates without turning on new features; and
    manually determining, by a system programmer, when to perform the actual version change.

12. The method of claim 1 further comprising:
    performing a system wide rollout by implementing version change across multiple instances of a select software application on at least one of the same platform or same mainframe computer.

13. The method of claim 1 further comprising:
performing a system wide rollout by implementing version change across multiple instances of a select software application on at least one of a different platform or a different mainframe computer.

14. The method of claim 1 further comprising:
utilizing a release control engine for managing separate plans for a rollout of new software version changes that are appropriate for an associated executing environment.

15. The method of claim 1 further comprising:
utilizing a release control engine to prepare a software application for a version change on multiple mainframe systems by individually preparing each software application instance for the version change on its corresponding mainframe computer; and
utilizing the release control engine to switch on the version change across all targeted mainframe computers when all software application instances across all mainframe computers targeted for the version change are verified to be compatible for the version change, in a single activity.

16. The method of claim 1, wherein:
receiving a software update indication that a select identified software application instance has been updated to a version that has a new compatibility level, where the select identified software application instance, when executed, continues to conform to the common execution level after the corresponding update, comprises:
comparing the identified compatibility level of the received version update with the compatibility level of each instance of the software application executing on the mainframe; and
switching on new compatibility level features if the compatibility level of the instance of the software application is not greater than the common execution level.

17. The method of claim 1 further comprising:
using a registration processor to interact with each identified software application instance to discover the installed components and to register the installed components and their dependencies in an upgrade repository.

18. The method of claim 1, wherein:
reconfiguring each identified software application instance to conform to the adjusted common execution level, comprises:
utilizing a policy language to define interactions that have to be validated against in order to implement an update.

19. The method of claim 1 further comprising:
performing when a version change is implemented:
automatically constructing a map for implementing a conditional back-out of a version change; and
backing up files necessary to restore the mainframe system back to its default state.

20. The method of claim 1 further comprising:
generating a dashboard view having:
details on execution libraries associated with the identified software application instances;
compatibility level information; and
compatibility status information.

* * * * *